Dec. 7, 1943. W. A. ANDERSON 2,335,989
ACCOUNTING MACHINE
Original Filed July 23, 1936  6 Sheets-Sheet 1

INVENTOR
WALTER A. ANDERSON.
BY
ATTORNEY

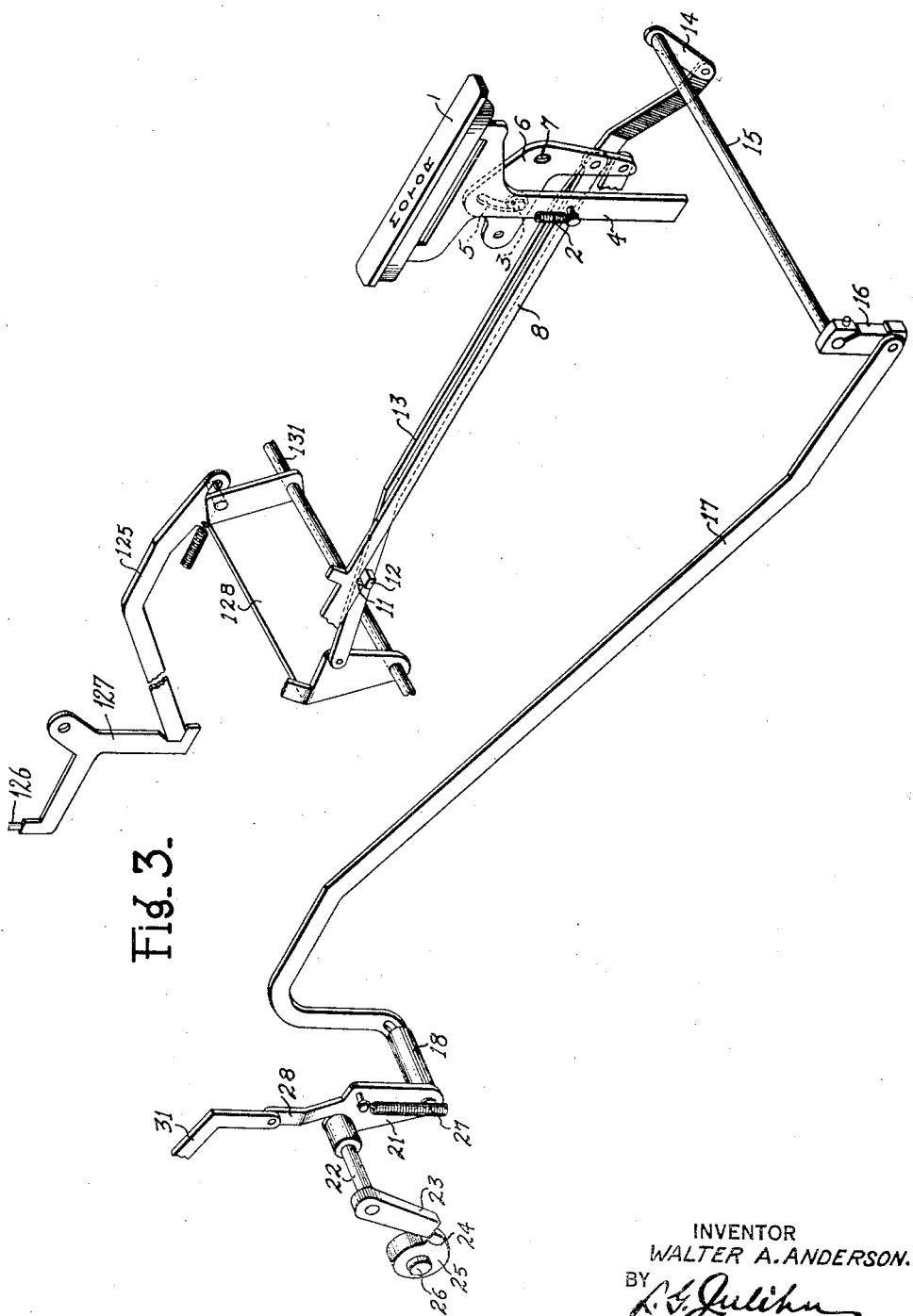

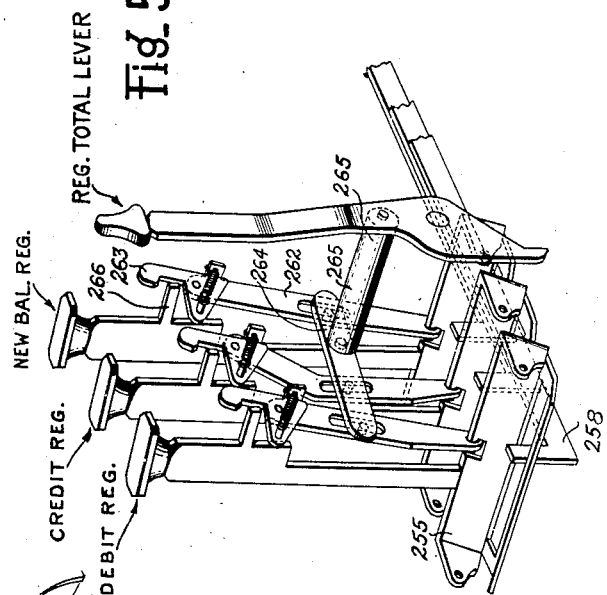
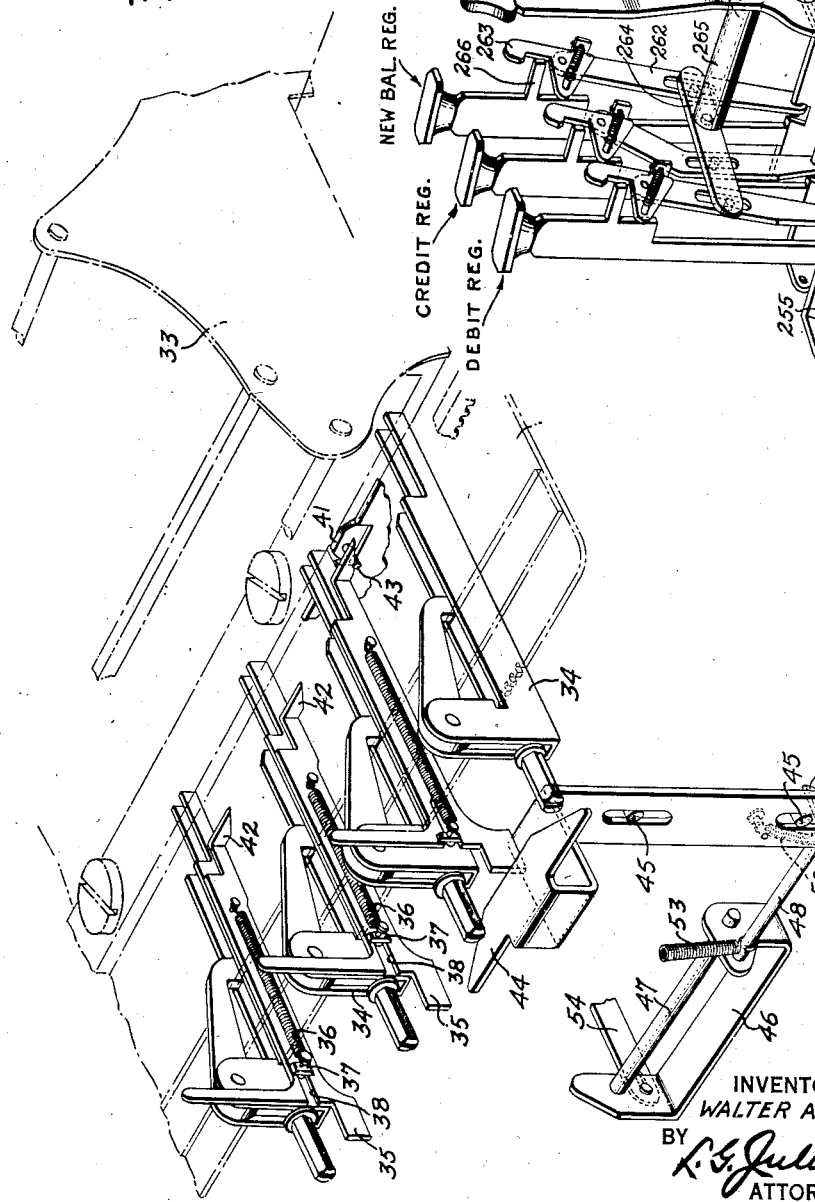

Dec. 7, 1943.  W. A. ANDERSON  2,335,989
ACCOUNTING MACHINE
Original Filed July 23, 1936   6 Sheets-Sheet 4
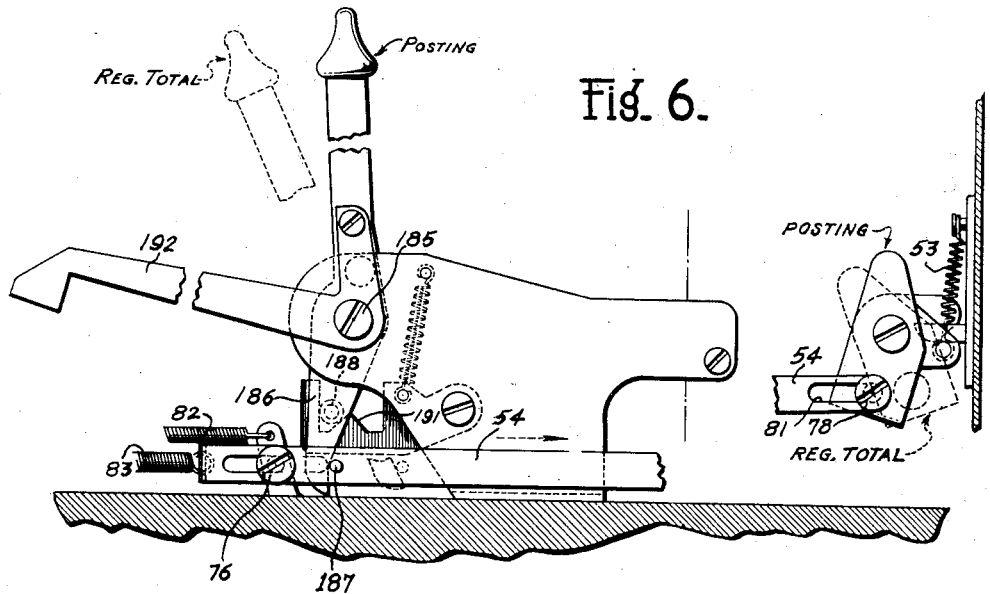
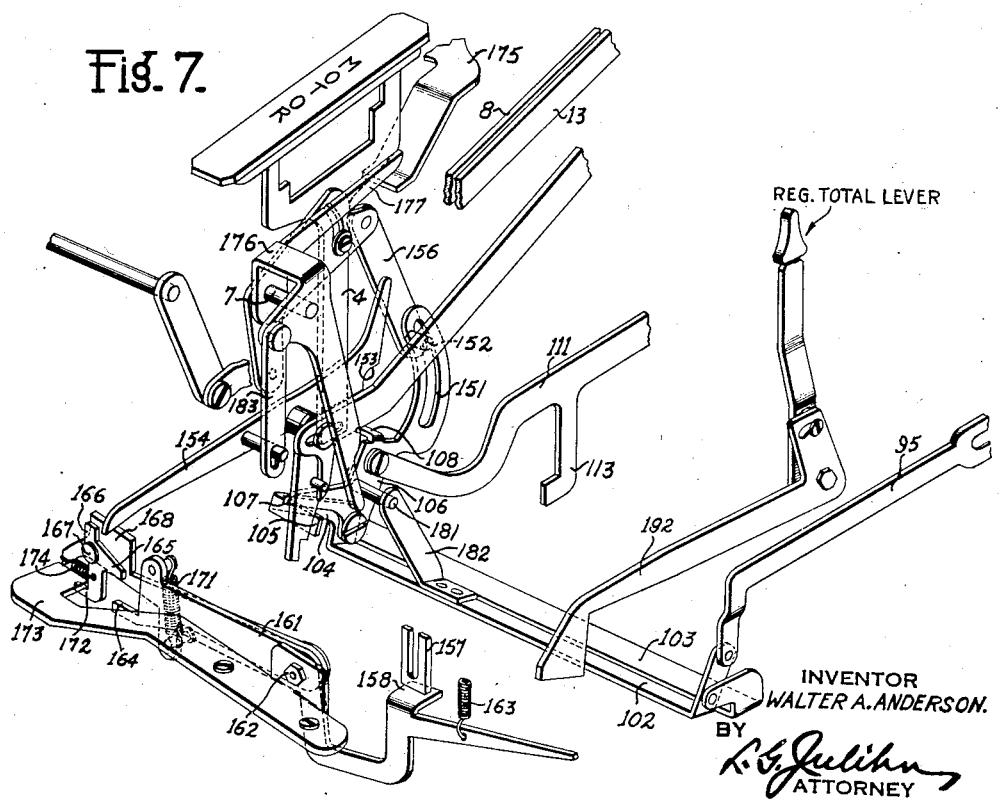
INVENTOR
WALTER A. ANDERSON.
BY
ATTORNEY Dec. 7, 1943.  W. A. ANDERSON  2,335,989
ACCOUNTING MACHINE
Original Filed July 23, 1936  6 Sheets-Sheet 5

INVENTOR
WALTER A. ANDERSON
BY
ATTORNEY

Dec. 7, 1943.                W. A. ANDERSON                2,335,989
                              ACCOUNTING MACHINE
                        Original Filed July 23, 1936    6 Sheets-Sheet 6

INVENTOR
WALTER A. ANDERSON.
BY
L. G. Julihn
ATTORNEY

Patented Dec. 7, 1943

2,335,989

UNITED STATES PATENT OFFICE 2,335,989

ACCOUNTING MACHINE

Walter A. Anderson, Bridgeport, Conn., assignor to Underwood Elliott Fisher Company, New York, N. Y., a corporation of Delaware Original application July 23, 1936, Serial No. 92,164. Divided and this application February 4, 1941, Serial No. 377,333

4 Claims. (Cl. 235—60)

This invention relates to accounting machines, and particularly to means for taking totals from registers successively and to means for printing symbols in connection with the printing to identify the registers from which the totals are taken.

This application is a division of my application Serial No. 92,164, filed July 23, 1936, now Patent No. 2,275,671.

In the use of accounting machines for producing business records, more than one accumulating register is frequently used for the accumulation of amounts printed on the work sheets. The printing of these entries during accumulation need not ordinarily be accompanied by symbols identifying the registers in which the amounts are accumulated because the work sheets on which the amounts are printed ordinarily have pre-printed headings for the various columns in which amounts are entered. However, the accumulated totals of the amounts entered during the day are usually printed on a plain sheet of paper or are printed at the foot of one of the journal sheets at a position in which it is not possible to identify the registers from which the totals were taken. It is therefore desirable to have each printed total accompanied by a symbol identifying the register from which it is taken.

It is accordingly an object of the present invention to provide a mechanism for printing appropriate symbols to identify the registers, and to have the symbols print only during register total taking operations.

It is a further object of the invention to provide a mechanism for taking totals from the several registers and printing them, together with their symbols, during continuous operation of the machine.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

In said drawings:

Figure 3 is a perspective of the machine starting mechanism,

Figure 8:
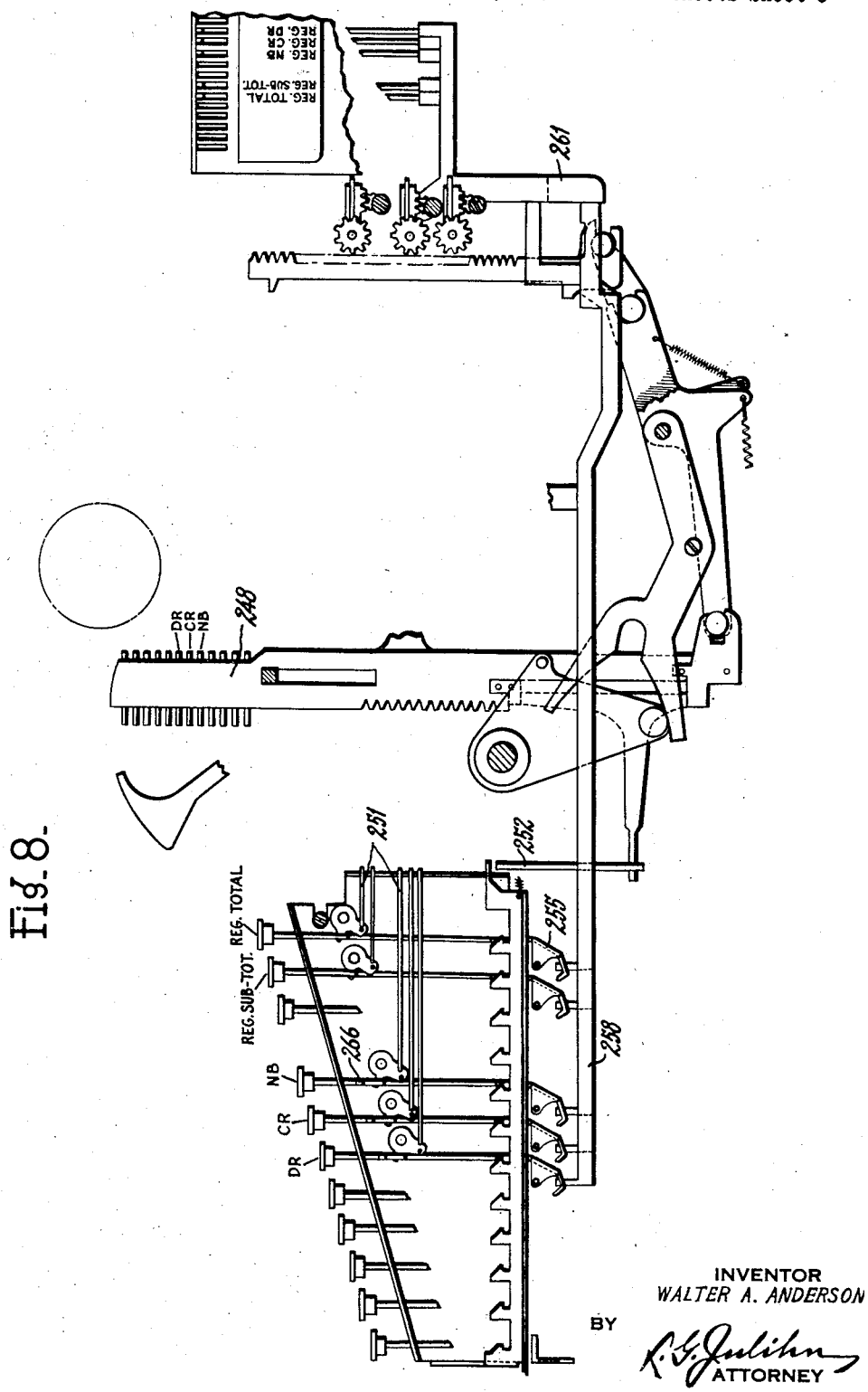

Figure 4 is a perspective of the rear left corner of the machine showing the tabulating control mechanism on the traveling paper carriage, Figure 5 is a perspective of the accumulating register selecting keys and the connections for depressing these keys by the paper carriage, under control of the automatic total lever, Figure 6 is a right side elevation of the automatic total lever and its connections with the carriage controls, Figure 7 is a perspective of the register total lever and the connections between this lever and the keyboard lock, Figure 8 is a right side elevation of the registers and the mechanism for printing the several identifying symbols, and Figure 9 is a diagrammatic showing of the carriage controls, together with a sample work sheet.

The machine disclosed in the present case is an improvement on the machines disclosed in U. S. Patent No. 2,194,270, issued March 19, 1940, to Oscar J. Sundstrand, and Patent No. 2,060,954, issued November 17, 1936, to Oscar J. Sundstrand.

The machine includes one crossfooter and four accumulating registers, three of which appear in the present disclosure. The machine is of the well-known ten-key, key set, motor operated type, having a traveling paper carriage with a number of controls thereon for causing the machine to automatically perform its many functions in the proper columnar positions of the work sheet.

Mechanism to start the machine

Referring to Figure 3, a motor bar 1 is mounted in the machine frame for vertical movement, and is held in its upper position by a spring 2. A stud 3 on the stem 4 of the motor bar rests normally in the bottom of a slot 5 in a lever 6 pivoted at 7 to the machine frame. A link 8 is pivoted to the lower arm of lever 6 and extends toward the rear of the machine. A shoulder 11 on link 8 lies behind a block 12 on another link 13 connected at its forward end to an arm 14 secured to a shaft 15 extending across the front of the machine. An arm 16, also secured to shaft 15, is pivoted to a link 17 connected at its rear end, by a pin and slot connection, to a stud 18 secured to a plate 21 pivoted on a shaft 22. An arm 23 secured to shaft 22 normally lies above a shoulder 24 on a cam 25 secured to a release shaft 26. A spring 27 secured to plate 21 normally holds these parts in the positions shown. An arm 28 extends upwardly from plate 21 and is connected to a link 31 extending toward the rear of the machine.

Depression of the motor bar oscillates lever 6 and pulls link 8 forward. Shoulder 11 pulls link 13 forward, rocking shaft 15 and pulling link 17 and plate 21 forward against the tension of spring 27. This rotates shaft 22, removing arm 23 from shoulder 24 and moving link 31 to the rear. The removal of arm 23 from shoulder 24 engages the clutch, and the movement of link 31 starts the electric motor in the manner disclosed in Patent No. 2,194,270. The starting of the motor, together with the engaging of the clutch, causes the machine to operate. The parts are returned to their normal positions at the end of the operation in the same manner as disclosed in Patent No. 2,194,270.

*Carriage tabulating mechanism in general*

Referring to Figure 4, a control plate 32 is attached to the rear of a paper carriage 33 to move therewith. Plate 32 carries a number of control magazines 34 rigidly secured thereto, certain of which are provided with control slides 35. These slides are mounted for sliding movement on control magazines 34 and are tensioned by springs 36 toward the rear of the machine, their rearward movement being limited by studs 37 extending through slots 38 in the slides. A release lever 41 pivoted in the machine frame normally lies in the path of lateral movement of the forward ends of control magazines 34 to stop the paper carriage by contact with the magazines, to properly position the carriage for printing in its several columnar positions. Normally, as disclosed in Patent No. 2,194,270, this lever and its associated mechanism (not shown) are operated during each machine operation to allow the carriage to advance one columnar position. However, since it is desirable at times that one or more columnar positions be skipped, offset skip cams 42 are provided on slides 35 to cooperate with a stud 43 on release lever 41 to depress the lever from the path of the magazine to which the slide is attached. By this mechanism, when it is desired to skip a particular columnar position, it is only necessary to move slide 35 for that position forward a sufficient distance to place cam 42 in alinement with stud 43. Then as the carriage enters that columnar position, lever 41 is depressed, allowing the carriage to move to the next position without stopping.

The means for moving the slide forward includes a cam slide 44 mounted on studs 45 for vertical movement. When it is desired to move slides 35 forward, it is only necessary to raise cam slide 44 from its normal position below the rear ends of slides 35 to one of its raised positions where it is in the path of the rear ends of these slides. Then as the carriage travels into a particular columnar position, the slide is cammed forward just before it reaches such position. Movement of cam slide 44 is controlled by a bail 46 pivoted on a rod 47 and having a long stud 48 contacting the lower edge of a shoulder 51 on cam slide 44. A spring 52 normally holds stud 48 in engagement with shoulder 51. From these parts it is obvious that oscillation of bail 46 will raise or lower cam slide 44 into or out of the path of slides 35. A spring 53 is connected to stud 48 and to the machine frame to urge cam slide 44 toward its upper position. Such movement, however, is regulated by a link 54 extending to the front of the machine. The adjustment of these parts under control of link 54 will be explained later. The details of construction of these parts and their operation is disclosed generally in Patent No. 2,194,270, to which reference may be had for details not given here.

*Automatic printing of totals from registers*

Figure 1:
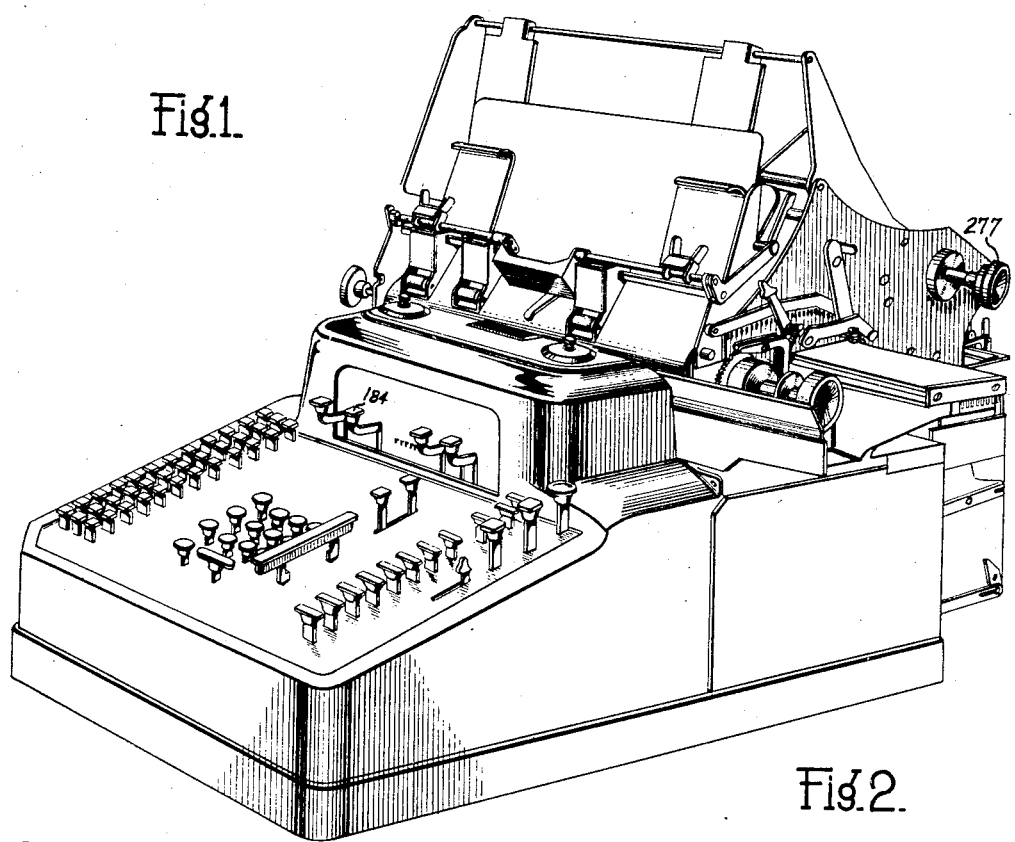
Figure 1 is a perspective of the machine.
Figure 2:
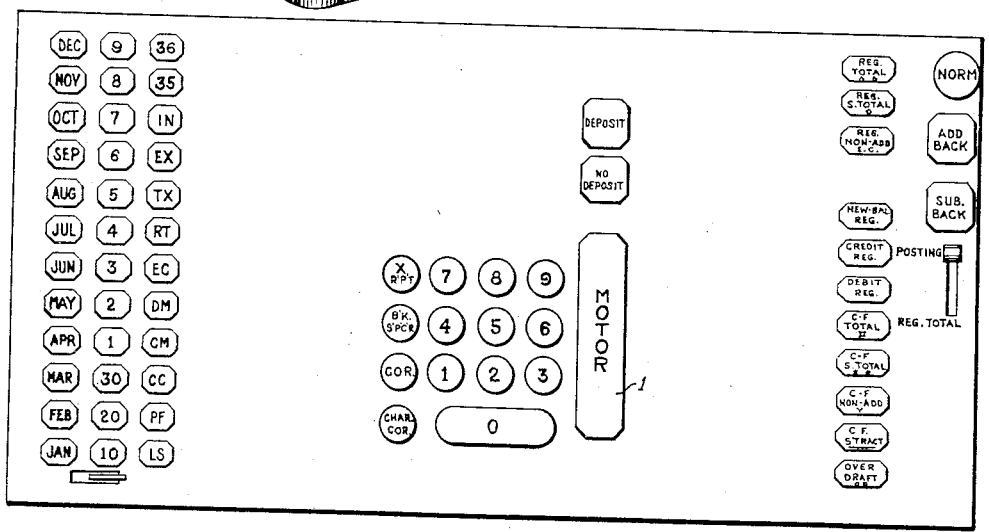
Figure 2 is a diagrammatic view of the keyboard.

At the end of a day's posting, it is desirable for the operator to take the totals from the A, B and C accumulating registers. This operation is performed by moving the register total lever (Figure 2) from its posting to its register total position and by depressing the motor bar or the conventional tabulating key 184 (Figure 1). The mechanism for performing this function will now be described.

The register total lever is pivoted at 185 (Figure 6) and has a downwardly extending arm 186 lying in front of a pin 187 on link 54. A roller 188 on arm 186 cooperates with a spring pressed detent 191 to hold the register total lever in either of its positions. Movement of this lever to its register total position shifts link 54 to its rearmost position, allowing spring 53 to elevate cam slide 44 to its highest or No. 4 position indicated in Figure 9.

Referring to Figure 7, an arm 192 is secured to the register total lever and has its forward end extending over the right end of the lever 161 pivoted at 162. The left end of lever 161 lies under the forward end of a lever 154 pivoted at 155. A link 183 connects lever 154 with a bail 176 pivoted at 7 and having an arm 177, the rear end of which lies directly above the forward end of an arm 175 of the keyboard lock. Movement of the register total lever to its register total position, therefore, lowers arm 192, which in turn rotates levers 161, 154 and bail 176 clockwise, causing arm 177 to depress arm 175 and lock the keyboard in the same manner that the motor bar locks the keyboard when it depresses arm 175. The manner in which depression of arm 175 locks the keyboard is fully disclosed in Patent No. 2,194,270.

Referring now to Figure 9, it will be found that when cam slide 44 is in its register total position it does not contact slide 35 in the second column, which allows skip cam 42 in this position to remain in ineffective position, so that the carriage will stop in this column for an operation. Since the control magazine in this position contains a motor repeat lug 193 in operative position when slide 35 is not operated, the machine will be automatically operated through a blank cycle, and since another lug 194 is in position to select the A register, this register will be engaged to have the total taken therefrom during the next operation.

Since the slides 35 in the third and fourth columnar positions are moved by cam slide 44 when it is in its highest position, the skip cams 42 thereon cause the carriage to tabulate through these columns. Slide 35 in the fifth columnar position will not contact cam slide 44, causing the carriage to stop in the fifth position for another cycle. The magazine in this position carries a motor repeat lug 195, a lug 196 to select the A register, a lug 197 to condition the machine for taking a total from the register and a lug 198 to prevent the total from being added into the crossfooter. By these lugs it is apparent that the machine will be automatically cycled to take the total from the A register, this being the total amount of the checks posted during the day's run. The carriage then skips column No. 6 and stops at column No. 7 for a blank cycle similar to that taken in the second column, this time, however, selecting the B register. At the end of this cycle, the carriage continues to the eighth columnar position where an operation similar to that in the fifth column will take place, with the exception that the B register is selected instead of the A. This causes the total to be taken from the B register, representing the total deposits posted during the day's run. The carriage then skips the ninth position and moves into the tenth. In this position, although the control slide 35 is moved forward, the column will not be skipped, due to the absence of a skip cam 42 on the forward end of the slide 35. The presence of a motor repeat lug 202 in this position and a lug 203 to select the C register causes the machine to take a blank cycle and select the C register preparatory to taking a total therefrom. The operation of control slide 35 protracts a lug 201 to prevent the C register signal from being printed during this operation. The machine then tabulates and stops in the eleventh column, where an operation similar to those in the fifth and eighth positions takes place, to take the total of the new balances from the C register. The carriage then advances to the twelfth columnar position where the machine executes a cycle which, in effect, is a blank cycle, and which has no bearing on the present invention. The machine then tabulates to the end of its working stroke where the mechanism disclosed in Patent No. 2,194,270 causes the carriage to return to its initial right hand position.

*Printing identifying symbols in the automatic totaling operation*

To identify totals taken from the registers, a special type bar 248 (Figure 8) is provided. As explained in Patent No. 2,194,270, the positioning of this type bar is controlled by depression of the control keys moving rods 251 into the path of upward movement of a rod 252 connected to the type bar. Therefore, to have the proper symbol printed, it is necessary to depress the corresponding control key, either manually or by the paper carriage.

In order that the keys for the A, B and C accumulating registers may be depressed by the movement of the paper carriage, a connection is provided between the key stems for these registers and their respective bails 255. This connection is shown in Figure 5, and includes links 262 connected to bails 255 and having hooks 263 on their upper ends. A bar 264 has pins extending through slots in links 262. This bar is rigidly secured to the stem of the register total lever by a long stud 265.

When the register total lever is in posting position, hooks 263 are not connected with pins 266 on the stems of the register keys, so that during posting operations, forward movement of links 258 and clockwise rocking of the bails 255 by the traveling carriage, in selecting the registers, will not be accompanied by a depression of the corresponding register keys. This effect is desirable since the register designating symbols are not wanted on the patron's statement sheet.

However, when the register total lever is moved to register total taking position, hooks 263 engage pins 266 so that selection of any one of the registers by the traveling carriage causes the corresponding register key to be pulled down. This enables the type bar 248 to rise the proper extent to print the appropriate symbol alongside the printed register total, as illustrated at the bottom of Figure 9.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described having a travelling carriage, a plurality of registers and means under the control of the carriage for selecting the registers for one type of operation or another, the combination of means for printing a symbol to identify each register, a manipulative member movable from one position to another to select the control of the carriage over the registers in accordance with the type of operation to be performed, and means controlled by the manipulative member to render the carriage controls effective or ineffective to operate the symbol printing means in accordance with the positioning of the manipulative member.

2. In a machine of the class described having a travelling carriage, a plurality of registers and means for entering amounts in the registers and for clearing the totals of the entered amounts therefrom, the combination of means for printing a symbol to identify each register, means for printing the entered amounts, said means being also operative under the control of the carriage to print the totals during continuous machine operation, a single key adapted to be operated prior to the total clearing operation from any of the registers, for enabling the carriage to control the type of operation to follow, and means, operated by the key, for rendering the symbol printing mechanism effective for operation during the taking of totals to print the appropriate symbols adjacent the printed totals.

3. In a machine of the class described having a travelling carriage, a plurality of registers and means for selecting the registers for operation, means for entering amounts in the registers, means under the control of the carriage for clearing the totals of the entered amounts from the registers, the combination of means including a type bar for printing a symbol to identify each register, means for controlling the movement of the type bar, means for printing the entered amounts, said means being also operative to print the totals during continuous machine operation, a key adapted to be operated prior to the total clearing operation, for enabling the carriage to control the type of operation to follow, and means controlled by the key, for connecting the register selecting mechanism with the means for controlling the movement of the type bar to enable the symbol printing mechanism to operate during the taking of totals to print the appropriate symbols adjacent the printed totals.

4. In a machine of the class described having a register, means for printing an identifying symbol for the register, indexing means to control printing of the symbol, a traveling carriage, and means moved under control of the carriage for selecting the register for accumulation, the combination of a connection between the last mentioned means and the indexing means normally lying in an idle position so that selection of the register under control of the carriage will not operate the indexing means, a manipulative element for enabling the carriage to control totaling of the register, and a means operated by the manipulative element for moving the connecting means to operative position so that selection of the register will operate the indexing means.

WALTER A. ANDERSON.